United States Patent [19]

Heidenreich

[11] 3,713,112

[45] Jan. 23, 1973

[54] REGISTRATION OF NOISE LEVEL IN COMMUNICATION SYSTEMS

[75] Inventor: Karl Heinz Heidenreich, 7419 Neuhausen/Erms, Germany

[73] Assignee: Wandel u. Goltermann, Reylingen, Germany

[22] Filed: Feb. 24, 1971

[21] Appl. No.: 118,336

[30] Foreign Application Priority Data

Feb. 26, 1970 Germany.....................P 20 08 954.7

[52] U.S. Cl. ..........340/173 R, 179/1 N, 235/61.7 R, 346/34, 346/55

[51] Int. Cl. ..........................G01d 9/16, G11c 19/00

[58] Field of Search................346/50, 54, 55, 35, 34; 179/1 P, 1 N, 175.3; 181/0.5 AP, 0.5 SM; 340/173 R; 235/151.13, 61.7

[56] References Cited

UNITED STATES PATENTS 3,363,067 1/1968 Seaver..................................179/1 P
2,901,739 8/1959 Freitas............................235/151.13

OTHER PUBLICATIONS

Instrumentation Magazine, Vol. 11, No. 1, March, 1958 Pages 4–8.

*Primary Examiner*—Bernard Konick
*Assistant Examiner*—Jay P. Lucas
*Attorney*—Karl F. Ross

[57] ABSTRACT

A noise detector receiving the outputs of one or more message channels works into a quantizer which, in response to a predetermined rise in cumulative noise, delivers a stepping pulse to a binary counter whose several stage outputs control respective hole punchers of a tape perforator. The quantizer and the counter are periodically reset by a programmer which also actuates another puncher to mark the beginning of each new day. A 1-hour average of the minute-mean noise-power values may be ascertained by a summing circuit which simultaneously receives, every 6 minutes, the 1-minute-mean values registered on the tape in 10 preceding 6-minute intervals; the output current of the summing circuit is compared with a reference current whose magnitude is 10 times that of a reference current equivalent to the maximum allowable 1-hour average.

15 Claims, 5 Drawing Figures

PATENTED JAN 23 1973 3,713,112
SHEET 1 OF 3
FIG. I
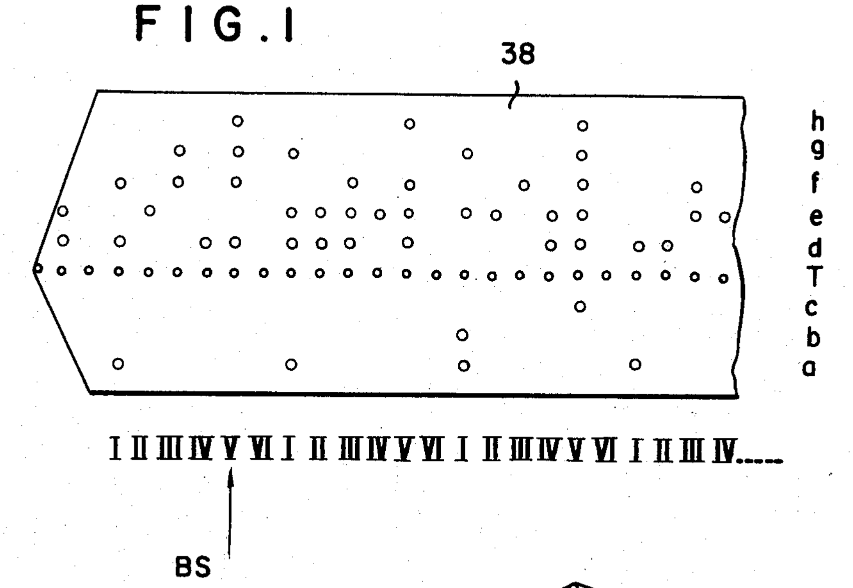
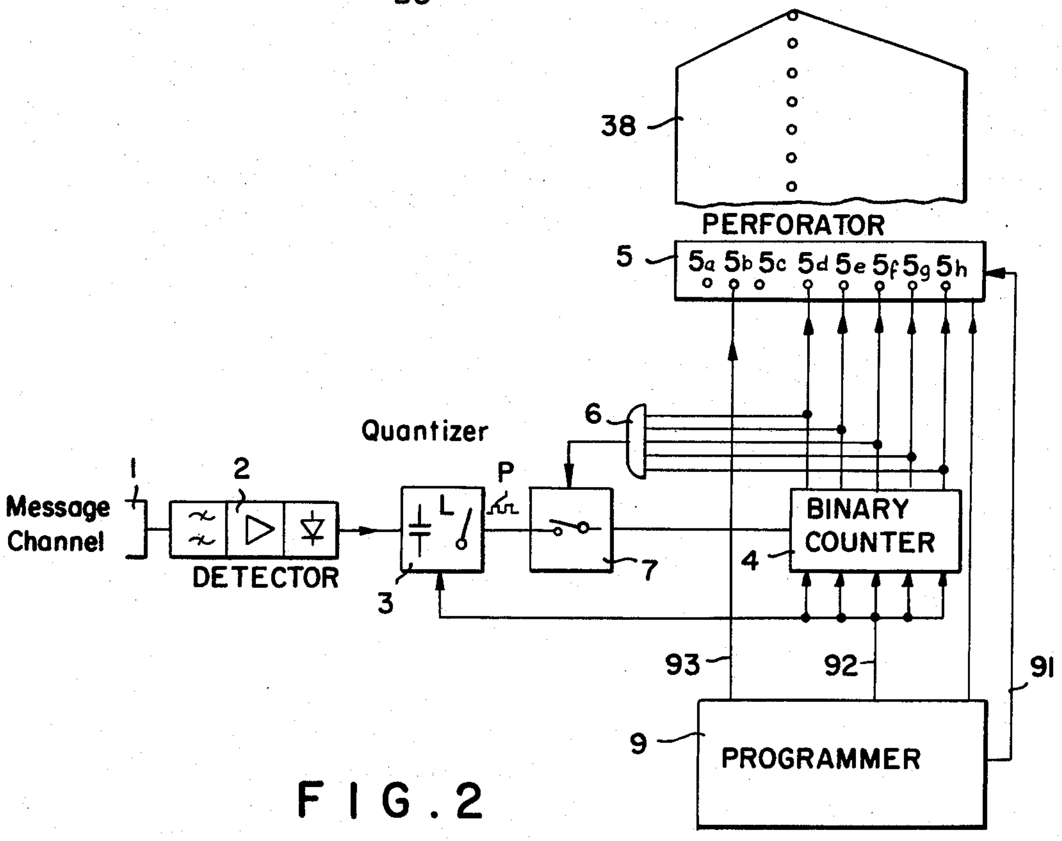
FIG. 2
INVENTOR.
KARL H. HEIDENREICH
BY
Karl F. Ross
ATTORNEY INVENTOR.
KARL H. HEIDENREICH
BY
Karl F. Ross
ATTORNEY

INVENTOR,
KARL H. HEIDENREICH

BY *Karl G. Ross*

ATTORNEY

REGISTRATION OF NOISE LEVEL IN COMMUNICATION SYSTEMS

My present invention relates to a method of and an apparatus for recording the noise level of one or more message channels in a communication system.

In the determination of admissible noise levels, the spurious wave energy detected in a monitored channel is averaged over a selected period for comparison with a standard applicable to such period. Reference may be made, in this connection, to Recommendations 393—1 and 395—1 of the International Radio Consultative Committee (C.C.I.R.), Documents of the XIth Plenary Assembly, Oslo 1966, Vol. IV, pages 62—67, as published by the International Telecommunication Union in Geneva (1967). According to these Recommendations, the noise power in any telephone channel on a 2,500-km hypothetical reference circuit for frequency-division multiplex radio-relay transmission, based on a zero relative level, should not exceed the following values:

1.1 7,500 pW 1-hour-mean power, psophometrically weighted;

1.2 7,500 pW 1-minute-mean power, psophometrically weighted, for more than 20 percent of any month;

1.3 47,500 pW 1-minute-mean power, psophometrically weighted, for more than 0.1 percent of any month;

1.4 1$\mu$W unweighted, averaged over an integrating period of 5 ms, for more than 0.01 percent of any month.

The psophometric weighting of noise is described in Reference Data for Radio Engineers, Fifth Edition (1969), IT&T, published by Howard W. Sams & Co., Inc., page 2—3.

The monitoring of a communication channel for the verification of these noise-level limitations can be carried out conventionally by stylus recorders, printers or the like which register the measured analog values, e.g., as integrated over the aforementioned 5-ms period, and which generally require considerable human effort in the evaluation of their results.

The general object of my present invention is to provide an improved method of and apparatus for recording the noise-level measurements in such a system with a view to simplifying both the equipment and the evaluation process, preferably with simultaneous registration of different averages for comparison with the aforestated standards.

Another, more specific object of my invention is to provide a method of and means for simultaneously monitoring a plurality of communication channels in the manner set forth.

In accordance with the present invention, the noise level of a channel to be monitored is periodically sampled; the samples, in digitized form, are utilized to control respective hole punchers of a tape perforator to register a binary code corresponding to the measured noise level, the tape being concurrently marked with indications of elapsed time such as, for example, the start of any new 24-hour period.

Such a tape can be readily evaluated by direct visual inspection as well as by computers programmed once and for all according to the established standards. If a plurality of *n* channels are to be monitored simultaneously, the noise power on each channel is detected and averaged over the *n*th part of a sampling period, this *n*th part preferably equaling 1 minute to enable direct determination of the 1-minute mean. With six channels, for example, each channel is monitored at 6-minute intervals. With the tape of the perforator advanced one step a minute, successive rows of perforations represent the 1-minute-mean noise power of the several channels in a predetermined cyclic sequence, expressed in a binary code which enables easy visual ascertainment of the order of magnitude of the equivalent analog values. At the beginning of each new cycle, i.e., in every sixth row of perforations in the example given, an additional mark appears on a track of the tape not used for the recording of bits of the digital code; besides the track serving to mark the elapsed time (e.g., at a rate of one mark a day), a further track may be utilized to register the concurrence of one or more instances of excessive instantaneous (e.g., 5-ms) noise levels within any sampling period.

Such a tape can readily be prepared for a time of one month in conformity of the evaluation periods contained in points 1.2 — 1.4, supra, of C.C.I.R. Recommendation 393—1.

The above and other features of my invention will be described in detail hereinafter with reference to the accompanying drawing in which:

FIG. 1 is a diagrammatic representation of a perforated tape as produced by a noise-level recorder according to my invention;

FIG. 2 is a block diagram of a recorder embodying the invention;

Figure 3:
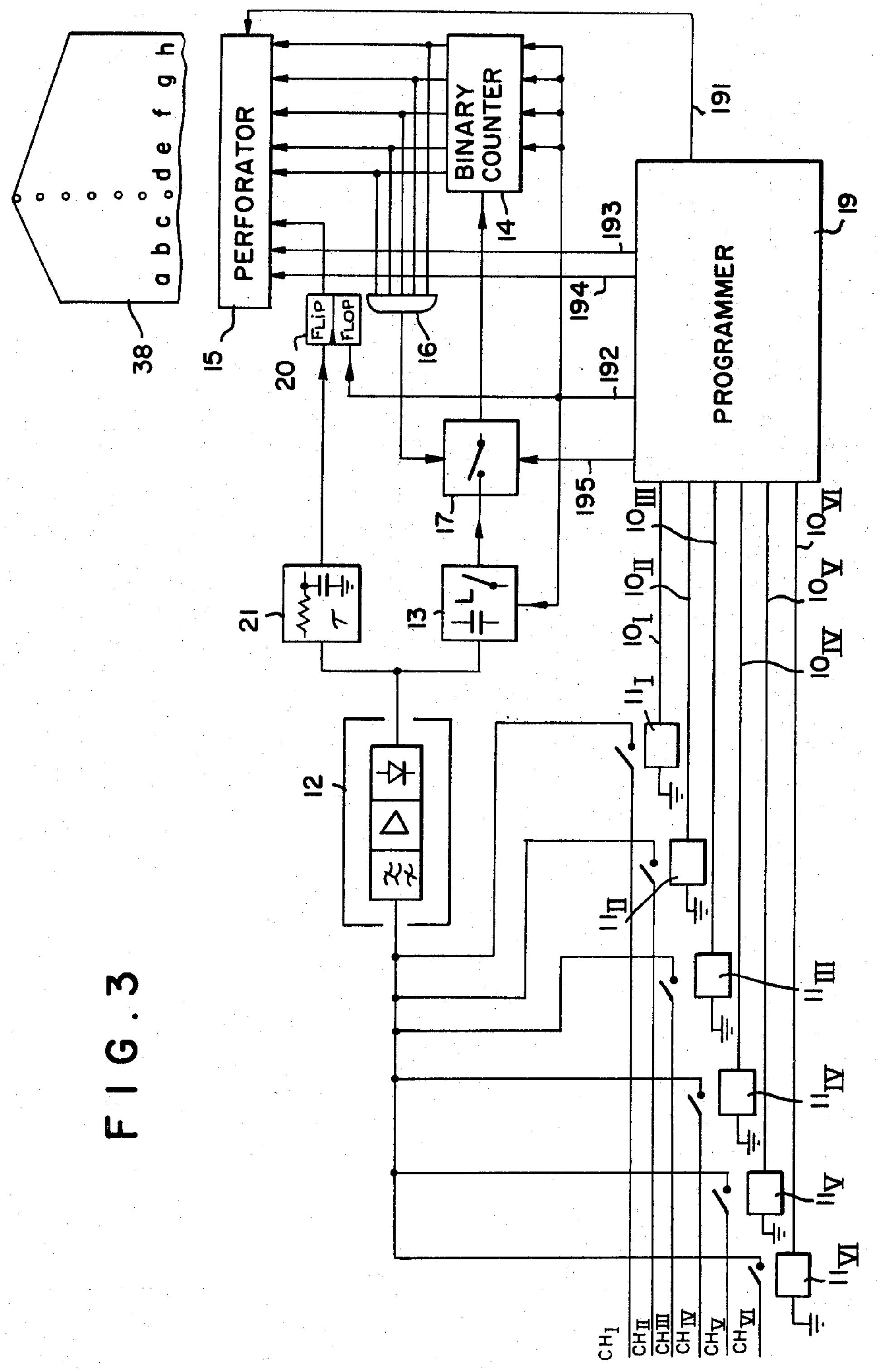
FIG. 3 is a diagram similar to FIG. 2, showing a more elaborate recorder for the simultaneous monitoring of six channels.

In FIG. 1 I have shown a paper tape 38 with eight recording tracks *a* — *h* and a transport track T engageable by the teeth of a sprocket wheel (not shown) forming part of a conventional perforator. The tape is assumed to advance once a minute, by one perforation of its transport track T, whereby each of these perforations defines a recording line on which there may be entered one or more larger holes as more fully described below. The holes on tracks *d* –*h* constitute, in the present embodiment, bits of a five-digit binary code of numerical value 1, 2, 4, 8 and 16, respectively; the line designated BS, for example, registers the binary number 11101 equivalent to the decimal value 29.

Successive lines, with or without code perforations, have been designated I through VI in conformity with respective communication channels monitored in a predetermined cyclic order. Each line I coincides with the beginning of a new cycle marked by perforations in track *a*. Track *b* is perforated once every 24 hours, thus at the beginning (or end) of a period which is a multiple of the 6-minute interval represented by the perforations on track *a*. Track *c* is perforated whenever, during any 1-minute subcycle, the instantaneous noise power as averaged over a fraction of a second (specifically 5 ms) exceeds the tolerance of Recommendation 1.4.

In FIG. 2 I have shown at 1 a monitoring circuit in the output of a message channel connected to a detector 2 schematically illustrated as comprising a bandpass filter tuned to a range of noise frequencies, an amplifier, and a rectifier. Detector 2 feeds a quantizer 3 graphically represented as a storage condenser and a switch which is closed whenever the condenser potential reaches a predetermined magnitude, the condenser being simultaneously discharged as is well known per se; this quantizer, accordingly, emits a stepping pulse P whenever the cumulative noise energy rises by a predetermined amount over its previous level. Stepping pulses P are delivered by way of a normally closed switch 7 to a five-stage binary counter 4 whose stage outputs condition respective hole punchers 5*a* – 5*h* of a perforator 5 for subsequent activation. Counter 4 is periodically cleared, at 1-minute intervals, by a zero-setting pulse on an output lead 92 of a programmer 9; this pulse also discharges the quantizer 3 and follows closely upon the emission, via another output lead 91 of the programmer, of a trigger pulse actuating the enabled punchers 5*a* – 5*h* of the perforator. Punchers 5*a* and 5*c* are not utilized in the embodiment of FIG. 2 yet puncher 5*b* receives an enabling pulse over a programmer output 93 once every 24 hours to register the passing of a day on the second track of tape 38.

An AND gate 6 has five inputs connected to the respective stage outputs of counter 4 and opens the normally closed switch 7, thus breaking the stepping circuit of the counter, whenever the count registered therein reaches its maximum (binary 11111), i.e., when every stage has been loaded.

FIG. 3 shows a generally similar arrangement wherein components 12 – 17 and 19 correspond to components 2 – 7 and 9 of FIG. 2. Six channels $CH_I$ – $CH_{VI}$ are simultaneously monitored by the detector 12 with the aid of a selector here shown as comprising six relays $\mathbf{11}_I$ – $\mathbf{11}_{VI}$ which are successively energized via respective outputs $\mathbf{10}_I$ – $\mathbf{10}_{VI}$ of programmer 19 to connect the associated channels to the input of detector 12. The output of this detector is here fed to an integrator 21 in parallel with quantizer 13, this integrator having a time constant $\tau$ which is substantially shorter than that of the capacitive storage circuit in the quantizer and, in this specific case, equals 5 ms. Thus, integrator 21 generates an output whenever successive stepping pulses or groups of such pulses are separated by less than the time constant $\tau$. This output reaches the setting input of a flip-flop 20 whose resetting input is periodically energized, once per minute, by an output pulse on a lead 192 of programmer 19 concurrently with the resetting of counter 14 and the discharge of quantizer 13. Another output lead 195 of the programmer briefly opens the switch 17 during each switchover from one channel to the next. In this embodiment, the first puncher 5*a* (FIG. 2) is enabled by a pulse on an output lead 194 of programmer 19 once every 6 minutes to mark the track *a* at the beginning of each new cycle, as discussed in connection with FIG. 1. Lead 193 establishes the day markings as previously described with reference to lead 93.

Flip-flop 20, when set, enables the puncher 5*c* so that a hole appears in the corresponding row at track *c* whenever integrator 21 generates one or more output pulses during the immediately preceding 1-minute subcycle.

The quantizer 13 produces a stepping pulse in response to any energy quantum (referred to zero level) of 100 pW-min, or 6,000 pW-sec, based on a (hypothetical) length of 100km for each channel. The response threshold of integrator 21 corresponds to the level of 1$\mu$W ($10^6$ pW) as specified in Recommendation 1.4.

Figure 4:
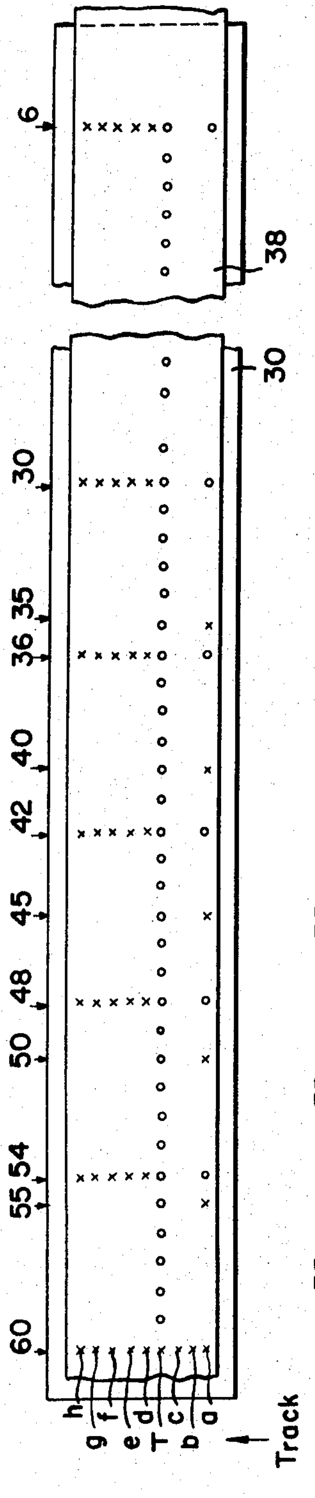
FIG. 4 shows the tape of FIG. 1 associated with a reader designed to be used conjointly with the equipment of FIG. 3.

FIG. 4 shows the tape 38 juxtaposed with a reader 30 disposed downstream of the perforator 15 of FIG. 3, preferably with small separation therefrom. This reader has 10 stations aligned with every sixth row of the tape, seven of these stations ST6, . . . . ST30, ST36, ST42, ST48, ST54 and ST60 having been illustrated in FIG. 4A. The numerical suffixes of these stations correspond to the number of minutes elapsed from the beginning of a 1-hour period at the instant when the corresponding code combination (diagrammatically represented by *x*'s in FIG. 4) has been punched.

Figure 4A:
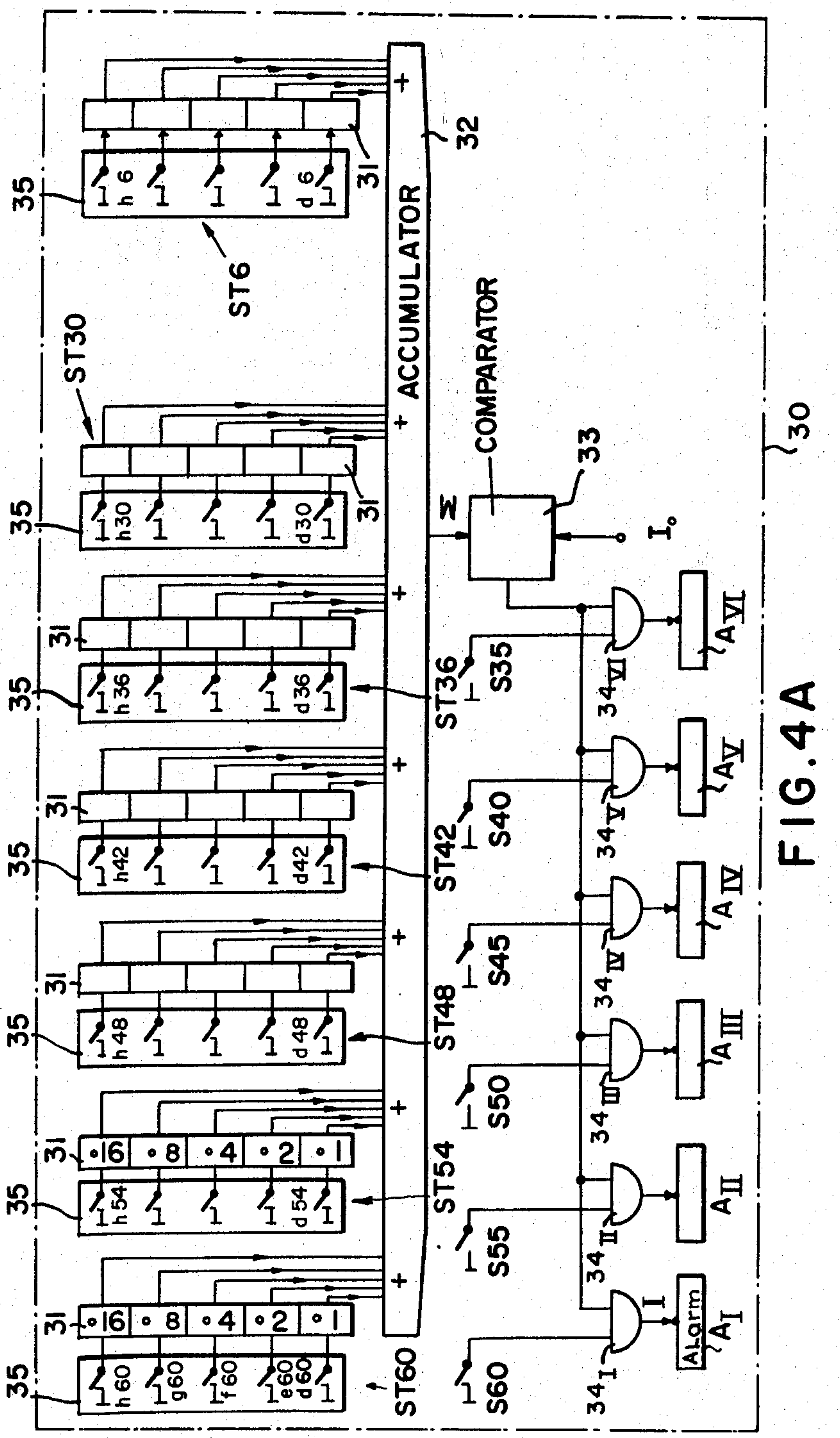
FIG. 4A shows details of the reader of FIG. 4.

As illustrated in FIG. 4A, each of these stations ST6—ST60 comprises a digital/analog converter 31 with five stages energizable by respective reading contacts generally designated 35, the contacts being aligned with tracks *d* – *h* and being designated *d*6, *d*30 etc., for the first and *h*6, *h*30 etc., for the last of these tracks. The converters 31 work into 10 summing inputs of an accumulator 32 whose output current is delivered to one input of a comparator 33 receiving a constant reference current $I_o$ on its other input. The output of comparator 33 is connected in parallel to respective inputs of six AND gates $\mathbf{34}_I$ –$\mathbf{34}_{VI}$ whose other inputs are sequentially energizable by respective switches S35, S40, S45, S50, S55 and S60. These switches are closed by sensors of the reader 30 whenever the correspondingly designated line (No. 35, 40 etc.) on tape 38 (FIG. 4) passes through an aligned position, as determined by the perforations on track *a*. Since the spacing of these lines differs by 1 from the separation of rows concurrently read, the reader 30 thus successively picks up the cumulative 1-hour measurements from each channel within an evaluation period of 6 minutes.

In order to convert the 10 1-minute averages of each concurrent pickup into a 1-hour mean, it is necessary to reduce the standard of comparison to one-sixth (i.e., to make the reference current $I_o$ equal to one-sixth or, more generally, 1/*n*th) of the equivalent of the standard limit which according to Recommendation 1.1 equals 7,500 pW per 2,500 km or 3 pW/km. Thus: If $l$ is the length of a message channel under test, the standard limit equals $l Km \cdot 3pW$. A reference current of $I^* = K \cdot l Km \cdot 3\,pW$ may be corresponding to this standard limit. With one message channel under test, 60 samples (minute-mean values of noise power) are available. An evaluation of all samples requires a reference current of 60 $I^*$ . If only 60/*n* samples are evaluated, as is the case in the recorder of FIGS. 3 and 4, the reference current must be reduced to $60/n \cdot I^*$. For $n = 6$, a reference current of $I_o = 10 \cdot K \cdot l Km \cdot 3\,pW$ results.

Each AND gate $\mathbf{34}_I$ – $\mathbf{34}_{VI}$ works into a respective indicator or alarm device $A_I$ — $A_{VI}$ which signals a rise above the permissible 1-hour mean in the noise level of a respective channel.

The system just described enables a determination of an excessive deterioration of any channel with a time lag of little more than 6 minutes.

I claim:

1. A noise-level recorder for a communication system with *n* message channels to be simultaneously monitored, comprising:

programmer means establishing a succession of predetermined cycles each subdivided into *n* subcycles respectively allocated to said message channels;

a tape marker including a plurality of aligned marking elements for an advancing tape;

a noise-level detector;

selector means controlled by said programmer for connecting said detector during each subcycle to the respective message channel for reception of noise energy propagated thereover;

quantizer means connected to said detector for integrating said noise energy over a subcycle and generating a stepping pulse upon the cumulative value thereof increasing by a predetermined amount;

multistage binary counting means connected to said quantizer means for actuation by the stepping pulses emanating therefrom and for delivering the pulse count to said tape marker;

circuitry controlled by said programmer means for actuating said tape marker to register said pulse count once per subcycle and for thereupon resetting said quantizer means and said counting means;

reading means for said tape disposed downstream of said tape marker, said reading means including a plurality of reading stations spaced along the path of said tape for simultaneous alignment with nonconsecutive rows of markings all produced during corresponding subcycles of successive cycles, said stations generating in each subcycle a combined output representative of the noise level of a respective channel as averaged over an extended period; and indicator means for signaling a rise of said averaged noise level above a predetermined limit.

2. A recorder as defined in claim 1, further comprising circuit-breaker means inserted between said quantizer means and said counting means for preventing further stepping of the latter upon the count thereof reaching a predetermined maximum.

3. A recorder as defined in claim 2 wherein said circuit-breaker means comprises a coincidence gate connected to respective stage outputs of said counting means and switch means controlled by an output of said coincidence gate.

4. A recorder as defined in claim 1 wherein said reading means includes accumulator means for periodically summing the individual outputs of said stations to produce said combined output and comparison means for matching combined output against a reference magnitude, said indicator means being controlled by said comparison means.

5. A recorder as defined in claim 4 wherein each of said reading stations is provided with a digital-analog converter, said accumulator means being a current generator responsive to the combined outputs of said converters, said comparison means including a source of constant current constituting said reference magnitude.

6. A recorder as defined in claim 5 wherein said indicator means comprises *n* alarm devices enabled by said programmer during successive subcycles to signal an excessive noise power on respective channels.

7. A recorder as defined in claim 1 wherein said tape marker is a perforator and said marking elements are hole punchers.

8. A recorder as defined in claim 7 wherein said programmer means has an output lead for actuating another hole puncher of said perforator at the beginning and at the end of said extended period.

9. A recorder as defined in claim 7, further comprising integrating means connected to said quantizer means in parallel with said counting means for receiving said stepping pulses therefrom and converting same into a continuous voltage, said integrating means having a time constant substantially shorter than said subcycles, and output means connecting said integrating means to a further hole puncher of said perforator for marking said tape in response to said voltage exceeding a predetermined limit.

10. A recorder as defined in claim 9 wherein said output means includes a flip-flop periodically resettable by said programmer means and settable by said voltage exceeding said limit.

11. A method of recording the noise level of a communication system with *n* message channels to be simultaneously monitored, comprising the steps of periodically sampling the noise level of each channel during a subcycle of a recurrent cycle divided into *n* subcycles respectively allocated to said channels, digitizing each sample, applying to an advancing tape during each subcycle a row of binary markings corresponding to a digitized sample, reading said markings at a location further downstream along the path of said tape at a plurality of stations spaced along said path for simultaneous alignment with nonconsecutive rows of markings all produced during corresponding subcycles of successive cycles, combining the individual readings of said stations into an output representative of the noise level of a respective channel as averaged over an extended period, comparing the combined output with a predetermined limit, and indicating a rise of said combined output above said limit.

12. A method as defined in claim 11 wherein the sampled noise power is averaged over an entire subcycle.

13. A method as defined in claim 12 wherein each sampling period measures *n* minutes and said extended period equals 1 hour.

14. A method as defined in claim 11 wherein the sampled noise level is averaged over 1 minute and each cycle measures several minutes, comprising the further step of substantially continuously ascertaining the instantaneous noise level and registering on said tape any rise of said noise level above a predetermined threshold within each cycle.

15. A method as defined in claim 14 wherein said instantaneous noise level is ascertained by averaging, over a fraction of a second, the amount of noise energy propagated over the monitored channel.

* * * * *